United States Patent
Eady et al.

(10) Patent No.: US 6,370,597 B1
(45) Date of Patent: Apr. 9, 2002

(54) SYSTEM FOR REMOTELY CONTROLLING AN ANIMATRONIC DEVICE IN A CHAT ENVIRONMENT UTILIZING CONTROL SIGNALS SENT BY A REMOTE DEVICE OVER THE INTERNET

(75) Inventors: Robert Eady, Ottawa (CA); Brian Shuster, Beverly Hills, CA (US)

(73) Assignee: United Internet Technologies, Inc., CA (US)

( * ) Notice: Subject to any disclaimer, the term of this patent is extended or adjusted under 35 U.S.C. 154(b) by 0 days.

(21) Appl. No.: 09/373,456

(22) Filed: Aug. 12, 1999

(51) Int. Cl.$^7$ ............................................... G05F 13/14
(52) U.S. Cl. ........................ 710/15; 710/5; 704/270; 700/259; 345/156; 345/339; 345/473
(58) Field of Search .................. 710/5, 15; 704/270; 700/259; 345/156, 339, 473

(56) References Cited

U.S. PATENT DOCUMENTS

| 5,142,803 A | * | 9/1992 | Lang ........................... 40/411 |
| 5,182,557 A | * | 1/1993 | Lang ........................... 341/20 |
| 5,963,217 A | * | 10/1999 | Grayson et al. ............ 345/473 |
| 5,977,951 A | * | 11/1999 | Danieli et al. .............. 345/156 |
| 5,977,968 A | * | 11/1999 | Le Blanc ..................... 345/339 |
| 5,983,190 A | * | 11/1999 | Trower, II et al. .......... 704/276 |
| 6,018,711 A | * | 1/2000 | French-St. George et al. ... 704/275 |
| 6,038,493 A | * | 3/2000 | Tow ............................. 700/259 |
| 6,040,841 A | * | 3/2000 | Cohen et al. ................ 345/473 |
| 6,075,195 A | * | 6/2000 | Gabai et al. ................... 84/645 |
| 6,118,449 A | * | 9/2000 | Rosen et al. ................ 345/339 |
| 6,118,459 A | * | 9/2000 | Hunter ........................ 345/474 |
| 6,121,981 A | * | 9/2000 | Trower, II et al. .......... 345/473 |
| 6,181,351 B1 | * | 1/2001 | Merrill et al. .............. 345/473 |

\* cited by examiner

*Primary Examiner*—Thomas Lee
*Assistant Examiner*—Abdelmoniern Elamin
(74) *Attorney, Agent, or Firm*—Blakely Sokoloff Taylor & Zafman

(57) ABSTRACT

An article including a computer readable medium having instructions stored thereon, which when executed, causes receipt of a control request from a first client for an animatronic device located on a second client and determining if the control request is serviceable by the animatronic device. In addition, the instructions also include sending the control request unaltered to the second client if the control request is serviceable by the animatronic device, and modifying the control request to a serviceable control request if the control request is not serviceable by the animatronic device.

16 Claims, 3 Drawing Sheets

SYSTEM 100

SYSTEM 100

SYSTEM FOR REMOTELY CONTROLLING AN ANIMATRONIC DEVICE IN A CHAT ENVIRONMENT UTILIZING CONTROL SIGNALS SENT BY A REMOTE DEVICE OVER THE INTERNET

FIELD OF THE INVENTION

This invention relates to the control of animatronic devices over a network. Specifically, this invention describes a method and apparatus for controlling animatronic devices over the Internet.

DESCRIPTION OF RELATED ART

There are currently many technologies that allow users to communicate over a network in real-time "chats". Users can either log on to servers using a web browser or specialized software and then "converse" with other users using text-based real-time messaging. One such example is the Internet Relay Chat (IRC) protocol. On IRC, several persons can simultaneously participate in a discussion over a particular 'channel', or even multiple channels. There is no restriction to the number of people that can participate in a given discussion, or the number of channels that can be formed over IRC.

Even as most real-time chat programs are text based, attempts have been made to add some additional multimedia and/or features to these programs by adding sound or other graphical animation to supplement the text that is generated by the user. For example, if a first user types the acronym "lol", which stands for "laugh out loud", when the user is communicating with a second user, a sound clip can be played at the computer of the second user that is of a laugh. Other examples include having a animated character on the screen that moves or has facial expressions in accordance to what is being typed on screen.

Although the addition of sounds and animation increases the simulation of interactivity for a user, these additions are limited to the computer and there is no three-dimensional interactivity. For example, there is no interaction with an animatronic device such as a doll that operates with a chat program.

One current product that exists under the market name "Activemates", as marketed by Microsoft Corporation, operate with the computer and applicable software to allow a computer user to run programs (content) associated with an animatronic device. This software can send/play audio through the device, and also control or trigger control of the mouth on the device to animate it. However, this product provides feedback based on the user's actions locally, and does not offer control from another user, either directly or indirectly. Specifically, there is no provision for controlling the device over a network such as the Internet.

Accordingly, there is a need for a method and apparatus for controlling animatronic devices over the Internet. Specifically, it would be desirable to have a device that may add to the experience of chat rooms. For users not active in chat-rooms, it would be desirable to allow their devices to become animated through a web site. This would allow content creators to use the technology to control the animatronic characters in conjunction with their web content.

SUMMARY OF THE INVENTION

What is disclosed is an article including a computer readable medium having instructions stored thereon, which when executed, causes receipt of a control request from a first client for an animatronic device located on a second client and determining if the control request is serviceable by the animatronic device. In addition, the instructions also include sending the control request unaltered to the second client if the control request is serviceable by the animatronic device, and modifying the control request to a serviceable control request if the control request is not serviceable by the animatronic device.

DETAILED DESCRIPTION

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), and the like. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

System Overview

A description of an exemplary system, which incorporates embodiments of the present invention, is hereinafter described.

The present invention relates to a method and apparatus for controlling animatronic devices over a network.

Figure 1:
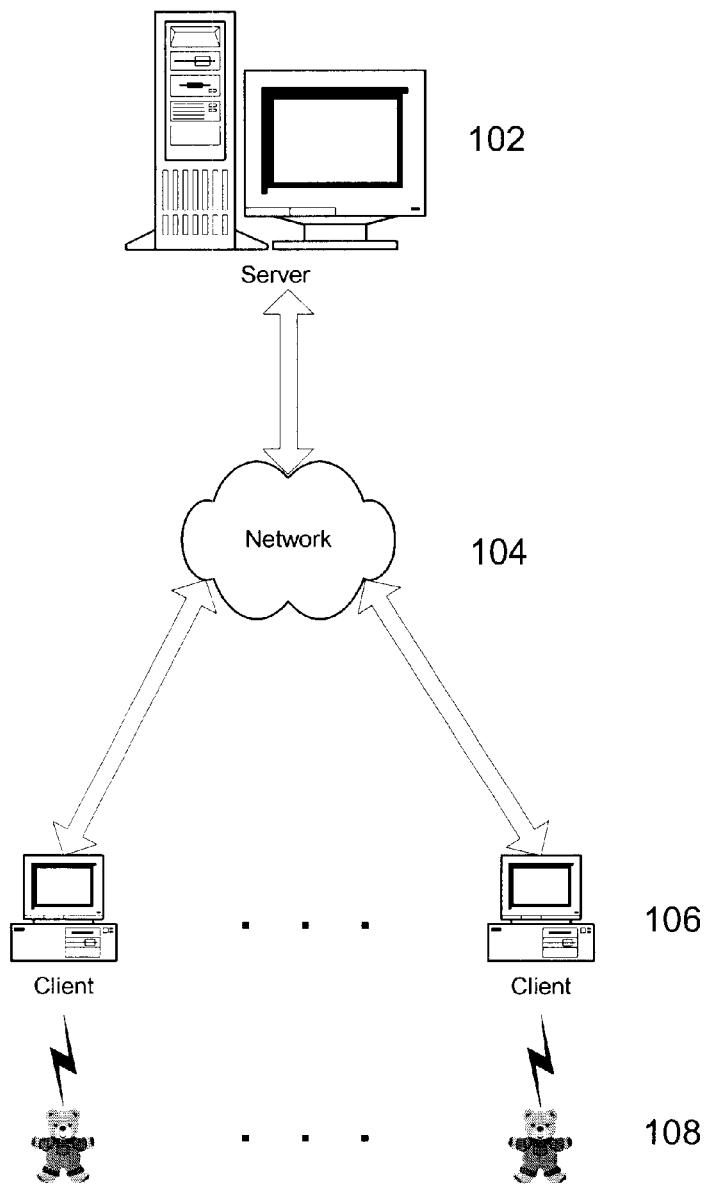
FIG. 1 is system block diagram of one embodiment of a system in which the apparatus and method of the invention is used.

FIG. 1 illustrates a system 100 configured in accordance with one embodiment of the present invention, containing a server 102, a network 104, and a set of clients 106 with a set of animatronic devices 108 connected to set of clients 106.

As further described below, server 102 includes various hardware components. This includes a processor, memory, and one or more network interface cards. In addition, server 102 may also include a variety of other hardware devices, including, but not limited to, storage devices (including floppy disk drives, hard disk drives, and optical disk drives), input devices (including a mouse or keyboard), and output devices (including displays and printers).

Each of the computer systems in set of clients 106 may include a variety of hardware components that are similar to server 102. In addition, each computer system may also be equipped with a data port for connection of one or more animatronic and other devices. In one embodiment, these include communications ports such as serial ports, which conform to the Institute of Electrical and Electronics Engineers (IEEE) RS-232 standard, IEEE-1284 parallel port standard, universal serial port (USB), or infra-red (IR) port for connection to set of animatronic devices 108.

Network 104 is a network that operates with a variety of communications protocols to allow client-to-client and client-to-server communications. In one embodiment, network 104 is a network such as the Internet, implementing transfer control protocol/internet protocol (TCP/IP).

Set of animatronic devices 108 can be made of various materials to form a toy figure. It is controlled through the use of a respective computer in set of computer system 106 to which it is connected.

Figure 2:
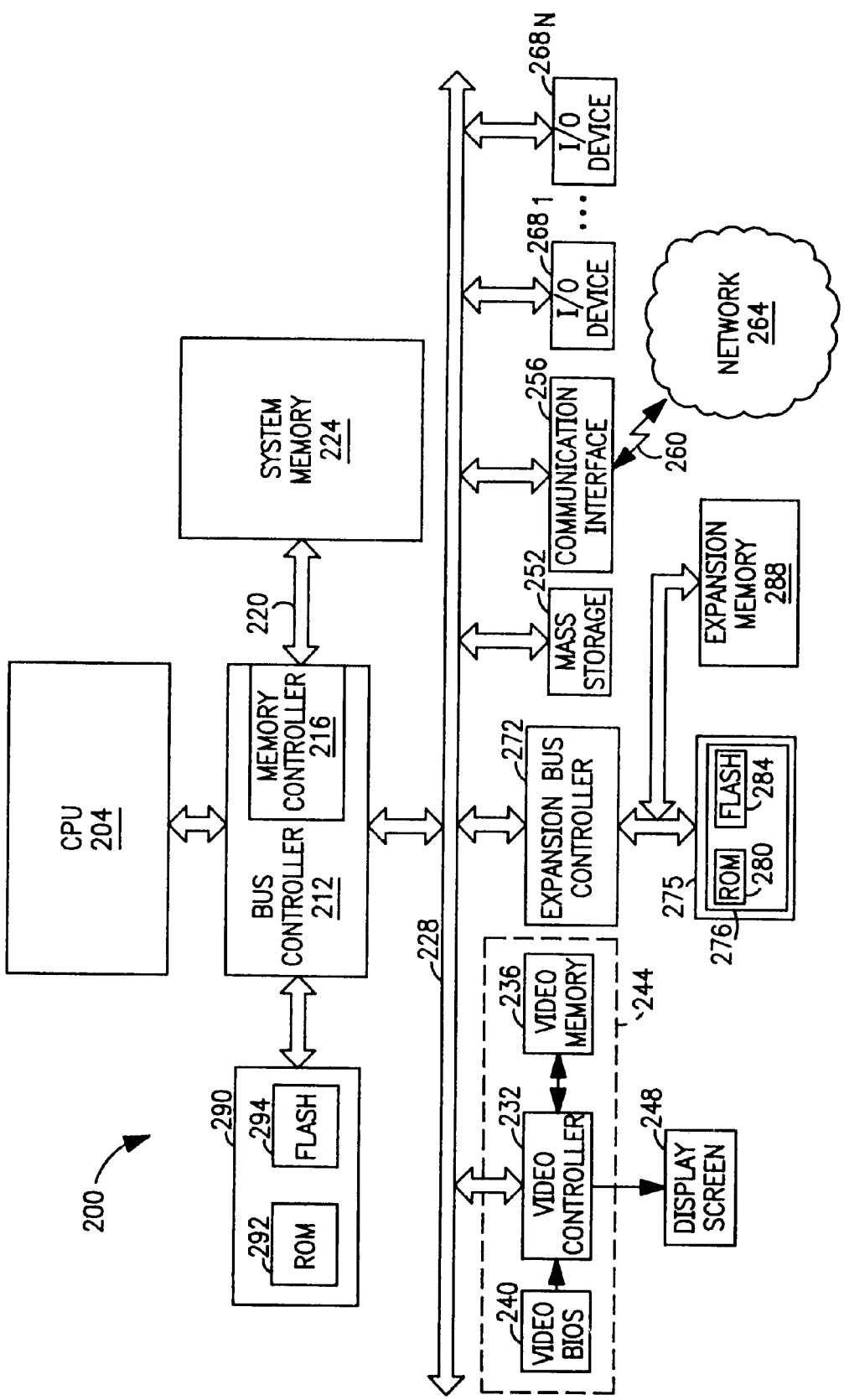
FIG. 2 illustrates an exemplary processor system or user computer system that ay implement embodiments of the present invention.

FIG. 2 illustrates an exemplary computer system 200 that implements embodiments of the present invention. The computer system 200 illustrates one embodiment of server 102 and set of clients 106 (FIG. 1), although other embodiments may be readily used.

Referring to FIG. 2, the computer system 200 comprises a processor or a central processing unit (CPU) 204. The illustrated CPU 204 includes an Arithmetic Logic Unit (ALU) for performing computations, a collection of registers for temporary storage of data and instructions, and a control unit for controlling operation for the system 200. In one embodiment, the CPU 204 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 204. The CPU 204 is not limited to microprocessor but may take on other forms such as microcontrollers, digital signal processors, reduced instruction set computers (RISC), application specific integrated circuits, and the like. Although shown with one CPU 204, computer system 200 may alternatively include multiple processing units.

The CPU 204 is coupled to a bus controller 212 by way of a CPU bus 208. The bus controller 212 includes a memory controller 216 integrated therein, though the memory controller 216 may be external to the bus controller 212. The memory controller 216 provides an interface for access by the CPU 204 or other devices to system memory 224 via memory bus 220. In one embodiment, the system memory 224 includes synchronous dynamic random access memory (SDRAM). System memory 224 may optionally include any additional or alternative high speed memory device or memory circuitry. The bus controller 212 is coupled to a system bus 228 that may be a peripheral component interconnect (PCI) bus, Industry Standard Architecture (ISA) bus, etc. Coupled to the system bus 228 are a graphics controller, a graphics engine or a video controller 232, a mass storage device 252, a communication interface device 256, one or more input/output (I/O) devices $268_1$–$268_N$, and an expansion bus controller 272. The video controller 232 is coupled to a video memory 236 (e.g., 8 Megabytes) and video BIOS 240, all of which may be integrated onto a single card or device, as designated by numeral 244. The video memory 236 is used to contain display data for displaying information on the display screen 248, and the video BIOS 240 includes code and video services for controlling the video controller 232. In another embodiment, the video controller 232 is coupled to the CPU 204 through an Advanced Graphics Port (AGP) bus.

The mass storage device 252 includes (but is not limited to) a hard disk, floppy disk, CD-ROM, DVD-ROM, tape, high density floppy, high capacity removable media, low capacity removable media, solid state memory device, and combinations thereof. The communication interface device 256 includes a network card, a modem interface, or a similar communications device for accessing network 264 via communications link 260. In addition, communications interface device 256 includes communication ports such as serial ports (e.g., IEEE RS-232), parallel ports (e.g., IEEE-1284), Universal Serial Bus (USB) ports, and infra-red (IR) ports.

The I/O devices $268$–$268_N$ include a keyboard, mouse, audio/sound card, printer, and the like. The expansion bus controller 272 is coupled to nonvolatile memory 275, which includes system firmware 276. The system firmware 276 includes system BIOS 82, which is for controlling, among other things, hardware devices in the computer system 200. The system firmware 276 also includes ROM 280 and flash (or EEPROM) 284. The expansion bus controller 272 is also coupled to expansion memory 288 having RAM, ROM, and/or flash memory (not shown). The system 200 may additionally include a memory module 290 that is coupled to the bus controller 212. In one embodiment, the memory module 290 comprises a ROM 292 and flash (or EEPROM) 294.

As is familiar to those skilled in the art, the computer system 200 further includes an operating system (OS) and at least one application program, which in one embodiment, are loaded into system memory 224 from mass storage device 252 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 200, unless indicated otherwise. Such operations are sometimes referred to as being computer-executed. It will be appreciated that operations that are symbolically represented include the manipulation by CPU 204 of electrical signals representing data bits and the maintenance of data bits at memory locations in system memory 224, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 3:
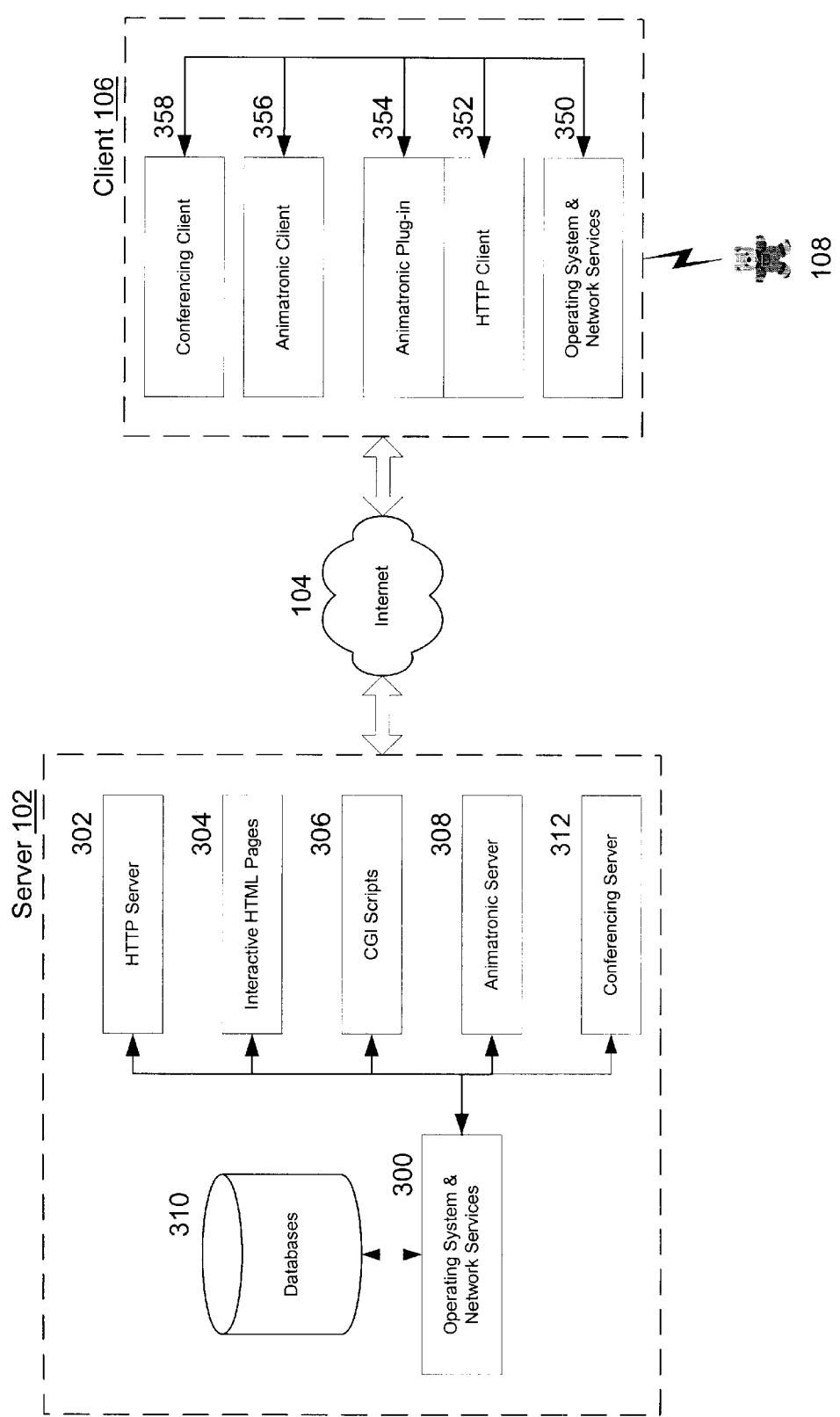
FIG. 3 illustrates a block diagram detailing portions of one embodiment of the server of FIG. 1 configured in accordance with one embodiment of the present invention.

FIG. 3 is a functional block diagram of server 102, including an operating system 300, an http server 302, a set of interactive hypertext mark-up language (HTML) 304, a set of common gateway interface (CGI) scripts 306, an animatronic server 308, a database 310, and a conferencing application 312. In one embodiment, operating system 300 provides network services for such network protocols as TCP/IP.

FIG. 3 also illustrates client 106, which contains an operating system 350, including network drivers for such networks such as TCP/IP), an HTTP client 352, an animatronic client 356, an animatronic plug-in 354, and a conferencing client 358.

Server 102 provides the following capabilities:

Basic network communication with multiple remote clients (e.g. set of clients 106) simultaneously.

Performing authentication and authorization of individual clients to communicate with animatronic server 308 on server 102 and/or other animatronic clients on remote clients (e.g., set of clients 106) that are also simultaneously connected to server 102.

Servicing HTTP requests from clients (e.g., set of clients 106) on the World Wide Web and communicating with animatronic control client browser plug-ins (e.g., animatronic plug-in 354).

Facilitating multiple users to communicate in both group and private conversations while connected to server 102.

HTTP server 302 is server software such as the product marketed under the name of Netscape Enterprise Server by Netscape Corporation, or the product marketed under the name of Internet Information Server by Microsoft Corporation. HTTP server 302 is capable of communicating with HTTP web clients via the HTTP protocol. In this capacity, HTTP server 302 is able to serve web clients with data (HTML, application output data, etc.).

Animatronic server 308 communicates with animatronic clients (e.g., animatronic client 356) and services their requests for control of other animatronic devices found on the network (Component C). When animatronic server 308 is initiated, it takes control of a TCP/IP service port and listens for incoming connections from various clients over a network such as network 104. When animatronic server 308 sees an incoming connection, it then attempts to confirm the validity of the client and the data that is being sent to animatronic server 308. Once this has been established, animatronic server 308 may then start a bi-directional conversation using a custom language that both the server and the client understand. Animatronic server 308 provides the following capabilities:

Provide information on animatronic devices (e.g., set of animatronic devices 108) with which it is able to communicate.

Act as a gatekeeper between client applications (e.g., between client applications running on set of clients 106), thereby controlling access to the animatronic devices.

Understand and provide control of animatronic devices no matter how sophisticated the device. For example, if a user were to attempt to move the mouth of an animatronic doll on a client system and that doll did not have a controllable mouth animatronic server 308 may identify this and return what components were actually controllable on the doll. Animatronic server 308 may also be configured to alter control requests to allow the request to be serviced. For example, if the animatronic device from the example above has a moveable head, the command may be altered to move the head for any mouth movements.

Communicate with scripts/plug-ins that allow a web-server such as HTTP server 302 to access animatronic server 308, thereby allowing multiple users to access it through a web-client without having to install or use an animatronic client.

Set of CGI scripts 306 enable HTTP server 302 to communicate with animatronic server 308, thereby allowing a web developer to create web content capable of accessing various animatronic devices on via a standard HTTP client. In the simplest form, set of CGI scripts 306 allows server 102 to request a list of active animatronic clients accessing the server and whether they are currently communicating and/or available for access via server 102.

Database 310 contains data of various types and that, when combined, forms content that is served to users via the server 102. Database 310, in one embodiment, is actually a collection databases containing information that may be accessed through a standard such as open database connectivity (ODBC) standard, as promoted by Microsoft Corporation. Information that may be contained in database 310 includes a listing of all animatronic devices and respective clients to which they are connected, the capabilities of the animatronic devices (e.g., what functions the animatronic devices have) and their status (e.g., whether they are currently accessible or not), and any information for any users that correspond to a particular animatronic device.

Conferencing application 312 communicates with remote conferencing clients (e.g., conferencing client 358) and with animatronic server 308 to provide conferencing capabilities between clients and control of animatronic devices by animatronic server 308 on those clients.

The functionality provided by HTTP server 302, animatronic server 308, and conferencing server 312 may be implemented over several computers. In addition, the services and data provided by database 310 may also be implemented on one or more servers. Using multiple servers provides scalability for both the applications using the data (e.g., the various servers-other than the database server), and the applications providing the data (e.g., the database servers).

Referring to FIG. 3, client 106 is capable of performing the following functions:

Basic network communication with server 102 and with other remote clients as directed by server 102.

Control of animatronic devices (e.g., animatronic device 108) connected to itself via an interface port and the processing of command sequences sent to it from server 102 (e.g., animatronic server 308) before converting this data into commands that it sends to the connected toy.

Communication with the conferencing software contained on server 102 with special command options to allow control of other toys connected to other clients through server 102.

Conferencing client 358 provides a program that interfaces with the multi-user-conferencing facilities of server 102. In addition, conferencing client 358 coordinates with animatronic client 356 to provide synchronized movement of any animatronic devices connected to client 106 with what is being displayed by conferencing client 358.

HTTP client 352 is a software program that works with HTTP, and is also known as a "browser" application. Similar products include the product marketed by Netscape Corporation under the name Netscape Navigator or the product marketed by Microsoft is Corporation under the name Internet Explorer. Animatronic plug-in 354 is a plug-in application that is specifically written to interface with HTTP client 352 to provide an interface to animatronic client 356.

Although the present invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. An article comprising a computer readable medium having instructions stored thereon, which when executed, causes:

receipt of a control request from a first client for an animatronic device located on a second client;

determining if the control request is serviceable by the animatronic device; and, sending the control request unaltered to the second client if the control request is serviceable by the animatronic device, and modifying the control request to a serviceable control request if the control request is not serviceable by the animatronic device.

2. A method for remotely controlling an animatronic device in a chat environment comprising the steps of:

a) taking control of a port connected to a network;

b) determining whether data received by the port is intended for an animatronic device;

c) if said received data is intended for an animatronic device, initiating a bi-directional conversation in said chat environment;

d) sending signals for controlling said animatronic device based upon signals received while in said chat environment.

3. The method defined by claim 2 wherein said chat environment is a private chat between two participants.

4. The method defined by claim 2 wherein said chat environment includes a plurality of participants.

5. A method for remotely controlling an animatronic device in a chat environment comprising the steps of:

a) communicating with a server;

b) receiving animatronic control signals from said server;

c) converting said animatronic control signals to commands for sending to an animatronic device.

6. The method defined by claim 5 further comprising the step of sending animatronic control signals to said server.

7. The method defined by claim 5 wherein said chat environment is a private chat between two participants.

8. The method defined by claim 5 wherein said chat environment includes a plurality of participants.

9. A method for remotely controlling an animatronic device comprising the steps of:

a) taking control of a port connected to a network;

b) determining whether data sent by a remote device over the network received by the port is intended for an animatronic device;

c) if said received data is intended for an animatronic device, sending signals over the network for controlling said animatronic device based upon said received data.

10. A method for remotely controlling an animatronic device comprising the steps of:

a) communicating with a server;

b) receiving animatronic control signals from said server;

c) converting said animatronic control signals to commands for sending to an animatronic device.

11. The method defined by claim 10 further comprising the step of sending animatronic control signals to said server.

12. The method defined by claim 10 further comprising the step of providing display control signals corresponding to said animatronic control signals to a display device to display an image whose movement is synchronized with movement of said animatronic device.

13. The method defined by claim 10 wherein if said animatronic control signals correspond to a movement which said animatronic device is incapable of performing, said commands are altered to correspond to a movement which said animatronic device is capable of performing.

14. The method defined by claim 10 wherein said animatronic control signals are created based on text entered by a first user at a location remote from a second user, said animatronic device being local to said second user.

15. The method defined by claim 14 wherein said entered text is an acronym.

16. A method for remotely controlling an animatronic device comprising the steps of:

a) sending animatronic control signals from a first client to a server;

b) receiving at said server, said animatronic control signals, said server forwarding said animatronic control signals to a second client;

c) receiving said animatronic control signals at said second client and converting said animatronic control signals to commands for controlling an animatronic device coupled to said second client.

* * * * *

UNITED STATES PATENT AND TRADEMARK OFFICE
CERTIFICATE OF CORRECTION

PATENT NO. : 6,370,597 B1  Page 1 of 1
APPLICATION NO. : 09/373456
DATED : April 9, 2002
INVENTOR(S) : Eady et al.

It is certified that error appears in the above-identified patent and that said Letters Patent is hereby corrected as shown below:

On The Title Page, after Assistant Examiner, please delete "Abdelmoniern" and insert -- Abdelmoniem --.

In Brief Description Of The Drawings, Column 2 line 15, please delete "ay" and insert -- may --.

Signed and Sealed this

Twentieth Day of November, 2007

JON W. DUDAS
*Director of the United States Patent and Trademark Office*